United States Patent
Lim, Jr.

(10) Patent No.: US 10,036,289 B2
(45) Date of Patent: Jul. 31, 2018

(54) OIL LEVEL MONITORING SYSTEM

(71) Applicant: Honorio Y. Lim, Jr., West Covina, CA (US)

(72) Inventor: Honorio Y. Lim, Jr., West Covina, CA (US)

( * ) Notice: Subject to any disclaimer, the term of this patent is extended or adjusted under 35 U.S.C. 154(b) by 176 days.

(21) Appl. No.: 15/164,003

(22) Filed: May 25, 2016

(65) Prior Publication Data

US 2017/0342879 A1  Nov. 30, 2017

(51) Int. Cl.
*F01M 11/12* (2006.01)
*G01F 23/04* (2006.01)

(52) U.S. Cl.
CPC ............. *F01M 11/12* (2013.01); *G01F 23/04* (2013.01)

(58) Field of Classification Search
CPC ................................ F01M 11/12; G01F 23/04
USPC ......... 116/28 R, 227–228, 276; 33/346, 365, 33/366.15, 366.17, 366.18, 721–722, 33/728–732
See application file for complete search history.

(56) References Cited

U.S. PATENT DOCUMENTS

| | | | | |
|---|---|---|---|---|
| 605,146 A | * | 6/1898 | Stokes | B01L 3/021 141/110 |
| 2,363,424 A | * | 11/1944 | Keenan | F16N 3/06 116/200 |
| 2,660,058 A | * | 11/1953 | Vogt | G01F 23/04 33/717 |
| 2,782,514 A | | 2/1957 | Scott et al. | |
| 3,316,647 A | * | 5/1967 | Swallert | G01F 23/04 33/722 |
| 3,371,418 A | * | 3/1968 | Moeller | G01F 23/04 215/360 |
| 3,594,906 A | * | 7/1971 | Kerfoot | G01F 23/04 33/717 |
| 3,662,470 A | * | 5/1972 | Sasgen | G01F 23/04 33/731 |
| 3,734,358 A | * | 5/1973 | Bergeron | B01L 3/0213 222/326 |
| 3,829,217 A | * | 8/1974 | Johnson | G01N 21/293 356/246 |
| 4,335,606 A | * | 6/1982 | Michalak | G01F 23/0046 33/721 |
| 4,831,877 A | | 5/1989 | Snow | |
| 5,101,327 A | * | 3/1992 | Jewett | F01M 11/12 362/120 |

(Continued)

FOREIGN PATENT DOCUMENTS

WO    WO060437    7/2003

*Primary Examiner* — R. A. Smith
*Assistant Examiner* — Tania Courson

(57) ABSTRACT

An oil level monitoring system includes a tube that may be fluidly coupled to an internal combustion engine. Thus, the tube may be in fluid communication with an oil reservoir in the internal combustion engine. A monitoring unit is removably inserted into the tube. The monitoring unit may be in fluid communication with the oil reservoir. The monitoring unit is substantially hollow. Thus, oil from the oil reservoir may be contained within the monitoring unit when the monitoring unit is inserted into the tube. The monitoring unit is comprised of a translucent material. Thus, the monitoring unit facilitates a level of the oil to be observed within the oil reservoir when the monitoring unit is removed from the tube.

6 Claims, 5 Drawing Sheets

(56) References Cited

U.S. PATENT DOCUMENTS

| | | | | |
|---|---|---|---|---|
| 5,289,898 | A | * | 3/1994 | Oberg .................... F01M 11/12 123/196 S |
| 5,485,681 | A | * | 1/1996 | Hitchcock ............... G01F 23/04 33/722 |
| 5,829,153 | A | * | 11/1998 | Hitchock ................ G01F 23/04 116/227 |
| 6,935,044 | B2 | | 8/2005 | Dougherty |
| 7,055,384 | B2 | | 6/2006 | Williams et al. |
| 7,134,220 | B2 | | 11/2006 | Porter et al. |
| 7,509,753 | B2 | | 3/2009 | Nicosia et al. |
| 8,136,261 | B2 | * | 3/2012 | Armistead ............. G01F 23/04 33/722 |
| 8,966,971 | B2 | | 3/2015 | Liimatta et al. |
| 9,587,533 | B2 | * | 3/2017 | Noguchi ................ F01M 11/12 |
| 2010/0095547 | A1 | * | 4/2010 | Armistead ............. G01F 23/04 33/722 |
| 2010/0139109 | A1 | * | 6/2010 | Armistead ............. G01F 23/04 33/727 |
| 2012/0097482 | A1 | * | 4/2012 | Miller ................. F01M 11/0458 184/6.4 |
| 2015/0135828 | A1 | | 5/2015 | Salter et al. |

\* cited by examiner

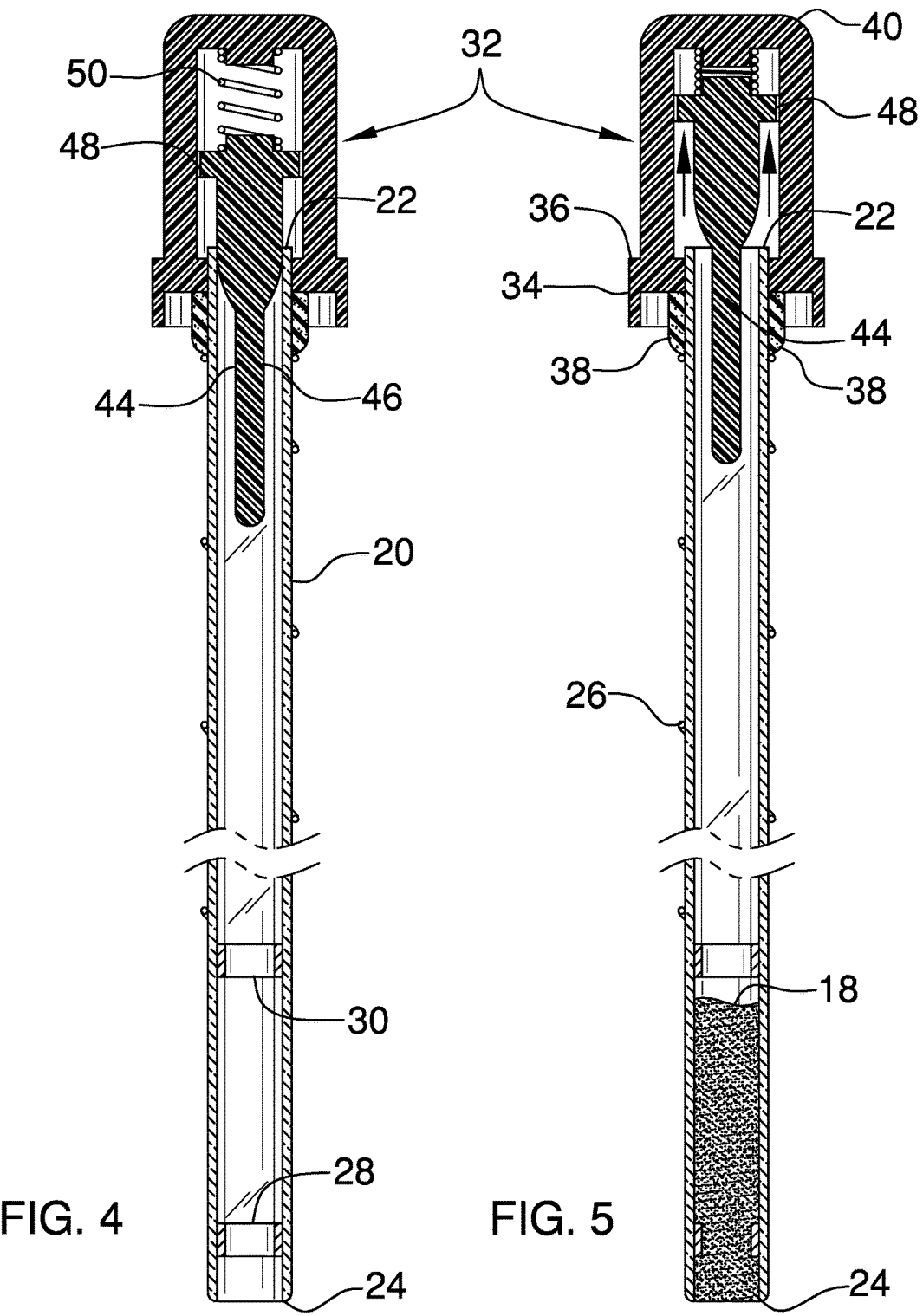

OIL LEVEL MONITORING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to monitoring devices and more particularly pertains to a new monitoring device for PURPOSE.

BRIEF SUMMARY OF THE INVENTION

An embodiment of the disclosure meets the needs presented above by generally comprising a tube that may be fluidly coupled to an internal combustion engine. Thus, the tube may be in fluid communication with an oil reservoir in the internal combustion engine. A monitoring unit is removably inserted into the tube. The monitoring unit may be in fluid communication with the oil reservoir. The monitoring unit is substantially hollow. Thus, oil from the oil reservoir may be contained within the monitoring unit when the monitoring unit is inserted into the tube. The monitoring unit is comprised of a translucent material. Thus, the monitoring unit facilitates a level of the oil to be observed within the oil reservoir when the monitoring unit is removed from the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a cross sectional view taken along line 4-4 of FIG. 1 of an embodiment of the disclosure in a closed position.

FIG. 5 is a cross sectional view taken along line 4-4 of FIG. 1 of an embodiment of the disclosure in an open position.

DETAILED DESCRIPTION OF THE INVENTION

Figure 1:
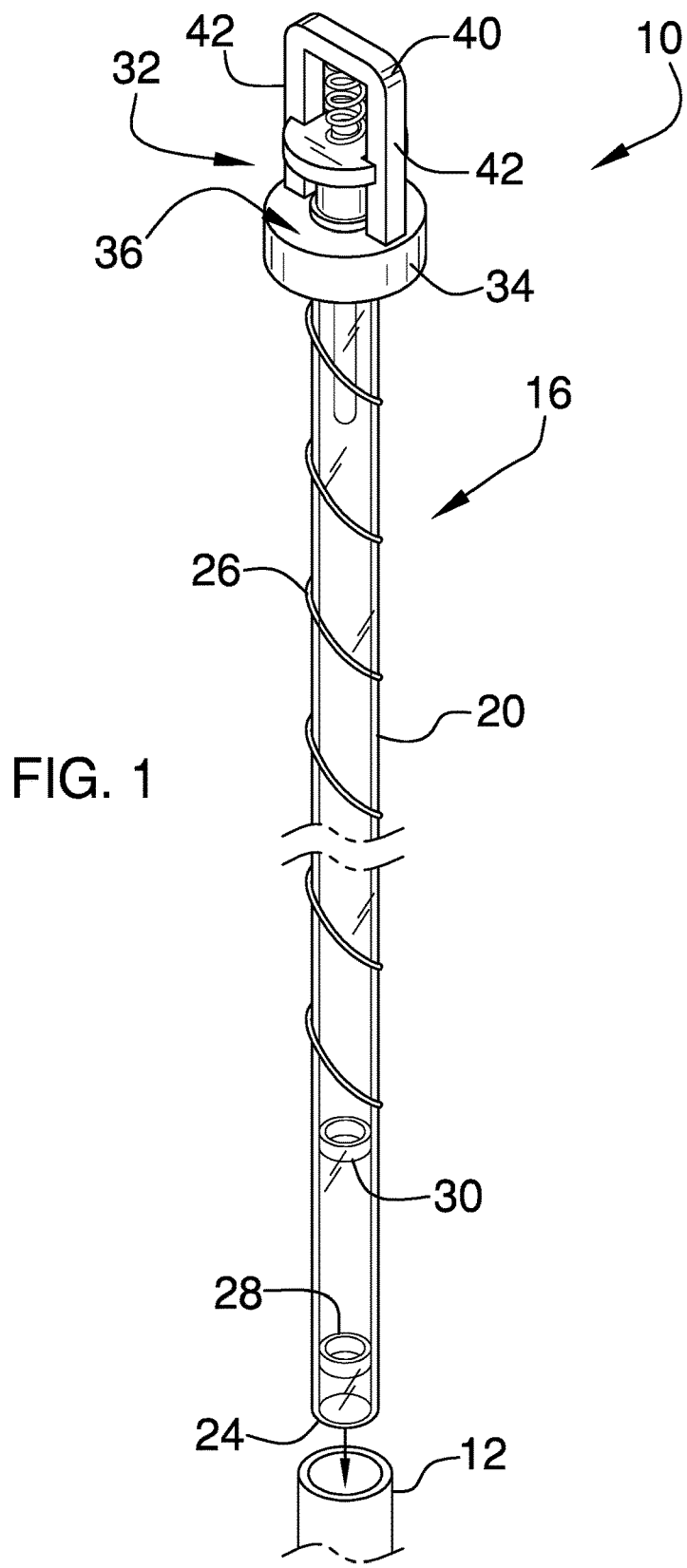
FIG. 1 is a perspective view of an oil level monitoring system according to an embodiment of the disclosure.
Figures 2, 3:
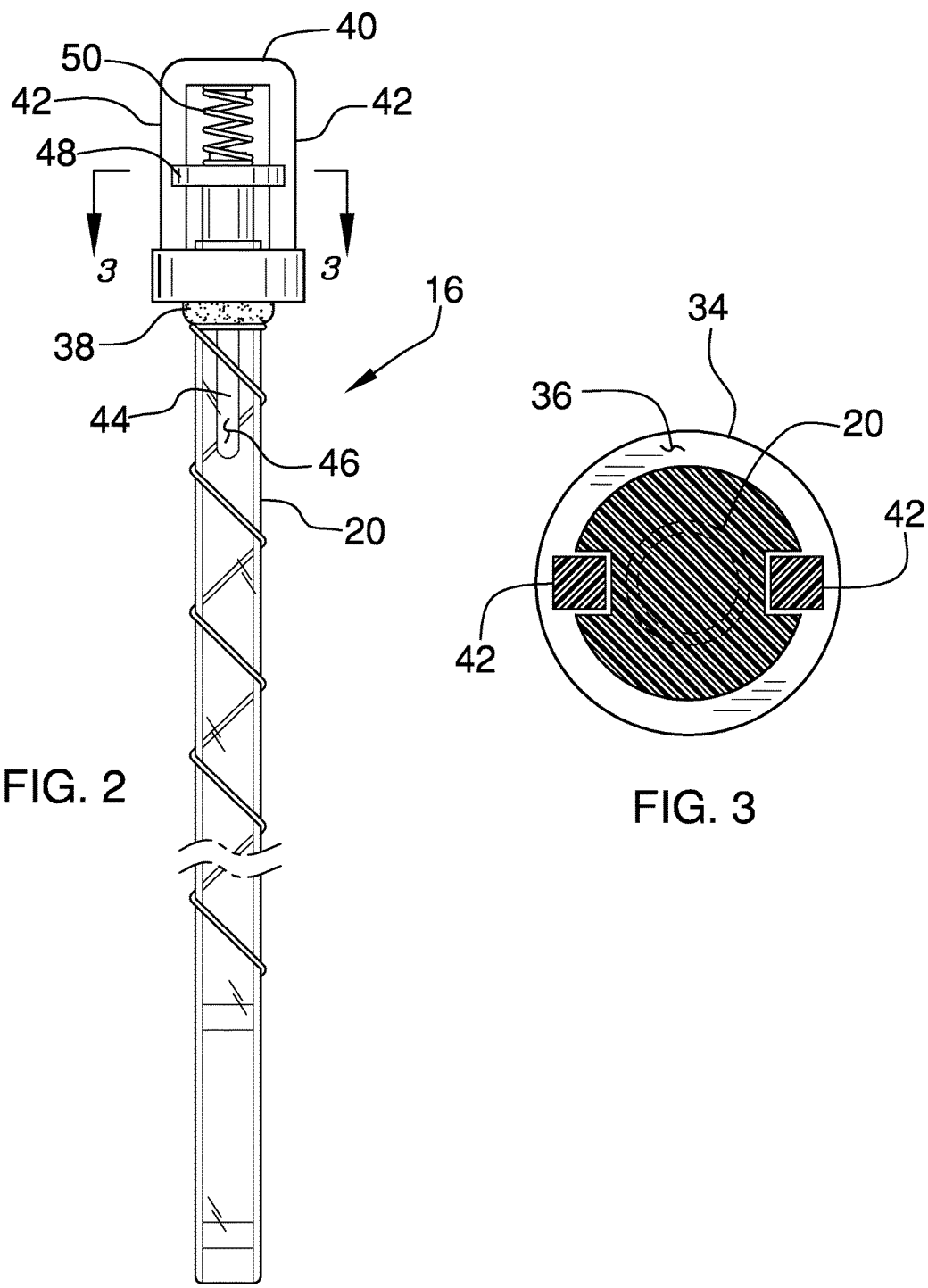
FIG. 2 is a back view of an embodiment of the disclosure.
FIG. 3 is a cross sectional view taken along line 3-3 of FIG. 2 of an embodiment of the disclosure.

With reference now to the drawings, and in particular to FIGS. 1 through 7 thereof, a new monitoring device embodying the principles and concepts of an embodiment of the disclosure and generally designated by the reference numeral 10 will be described.

As best illustrated in FIGS. 1 through 7, the oil level monitoring system 10 generally comprises a tube 12 that may be fluidly coupled to an internal combustion engine 14. Thus, the tube 12 may be in fluid communication with an oil reservoir 15 in the internal combustion engine 14. The internal combustion engine 14 may be a vehicle engine or the like. The tube 12 may be an oil dipstick tube 12 or the like.

A monitoring unit 16 is provided and the monitoring unit 16 is removably inserted into the tube 12. Thus, the monitoring unit 16 may be in fluid communication with the oil reservoir 15. The monitoring unit 16 is substantially hollow. Thus, oil 18 from the oil reservoir 15 may be contained within the monitoring unit 16 when the monitoring unit 16 is inserted into the tube 12. The monitoring unit 16 is comprised of a translucent material. Thus, a level of the oil 18 may be observed within the oil reservoir 15 when the monitoring unit 16 is removed from the tube 12.

The monitoring unit 16 comprises a pipe 20 that has a first end 22 and a second end 24. Each of the first end 22 and the second end 24 is open, and the pipe 20 is substantially hollow. The pipe 20 is removably inserted into the tube 12. The second end 24 may be submerged in the oil 18 thereby facilitating the oil 18 to enter the pipe 20. The pipe 20 is comprised of a translucent material. Additionally, the pipe 20 may be comprised of a flexible material.

A spring 26 is coiled around the pipe 20. The spring 26 inhibits the pipe 20 from frictionally engaging the tube 12. A low ring 28 is positioned within the pipe 20 and the low ring 28 is visible. The low ring 28 is positioned closer to the second end 24 than the first end 22. The low ring 28 indicates a minimum level of oil.

A high ring 30 is positioned within the pipe 20 and the high ring 30 is visible. The high ring 30 is positioned between the low ring 28 and the first end 22. Thus, the high ring 30 may indicate a maximum level of oil.

A stopper 32 is coupled to the first end 22 of the pipe 20 and the stopper 32 may be manipulated. The stopper 32 selectively closes the first end 22. Thus, the pipe 20 may retain the oil within the pipe 20 when the pipe 20 is removed from the tube 12. The stopper 32 selectively opens the first end 22 to facilitate the oil to move vertically within the pipe 20.

The stopper 32 comprises a flange 34 having the pipe 20 extending therethrough. The flange 34 is positioned adjacent to the first end 22. The flange 34 closes the tube 12 when the pipe 20 is positioned in the tube 12. The flange 34 has a top surface 36. A gasket 38 is positioned around pipe 20 and the gasket 38 abuts the flange 34. The gasket 38 frictionally engages the tube 12 when the pipe 20 is positioned in the tube 12. Thus, the gasket 38 forms a fluid impermeable seal with the tube 12.

A handle 40 is coupled to the flange 34 and the handle 40 may be gripped. The handle 40 includes a pair of spaced members 42. Each of the spaced members 42 extends upwardly from the top surface 36 of the flange 34.

A plunger 44 slidably extends through the flange 34 and the plunger 44 extends into the first end 22 of the tube 12. The plunger 44 has an outer surface 46 and the plunger 44 may be comprised of a resiliently compressible material. The plunger 44 is positioned in a closed position having the outer surface 46 frictionally engaging the first end 22. Thus, the plunger 44 may inhibit air from passing through the first end 22. The plunger 44 is positioned in an open position having the outer surface 46 being spaced from the first end 22. Thus, the plunger 44 facilitates air to pass through the first end 22.

A disk 48 is coupled to the plunger 44 and the disk 48 may be manipulated. The disk 48 slidably engages each of the spaced members 42 of the handle 40. The disk 48 is urged upwardly from the flange 34 when the plunger 44 is positioned in the open position. The disk 48 is urged downwardly toward the flange 34 when the plunger 44 is positioned on the closed position.

A biasing member 50 extends between the disk 48 and the handle 40. The biasing member 50 biases the disk 48 toward the flange 34. Thus, the plunger 44 is biased into the closed position. The biasing member 50 may comprise a spring 26 or the like.

Figure 6:
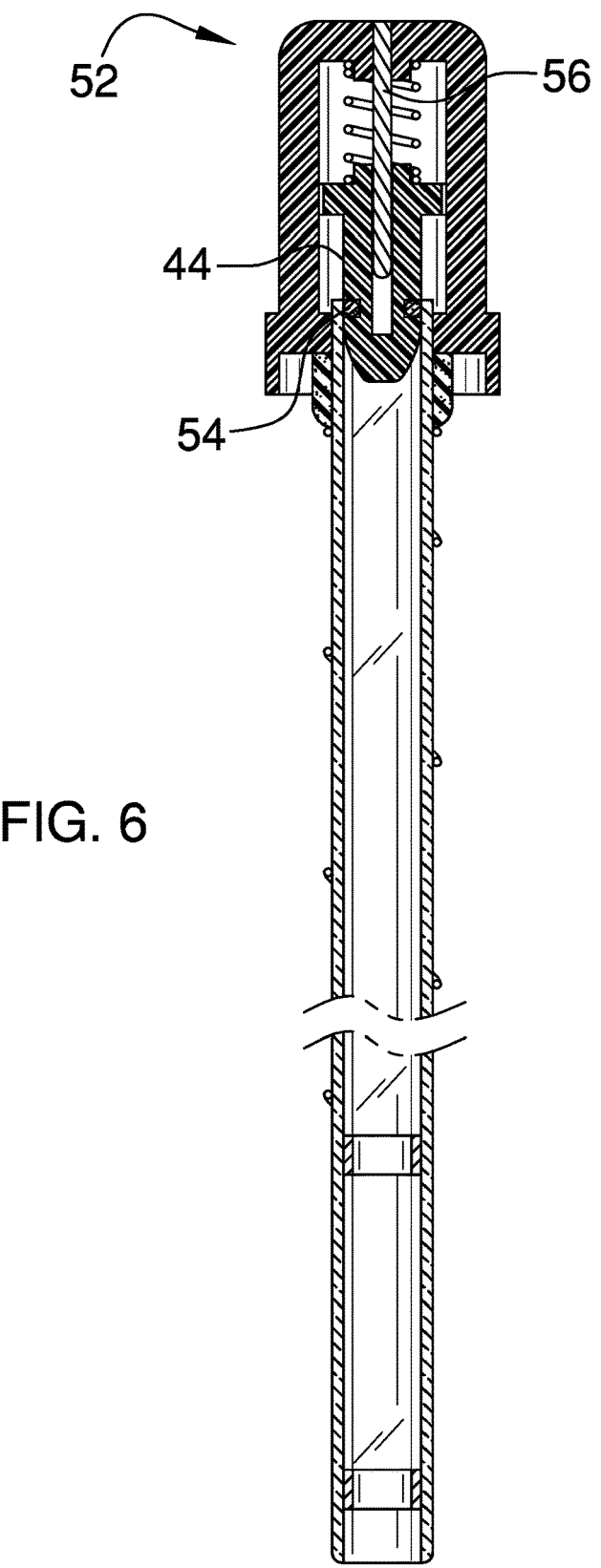
FIG. 6 is a perspective view of an alternative embodiment of the disclosure.
Figure 7:
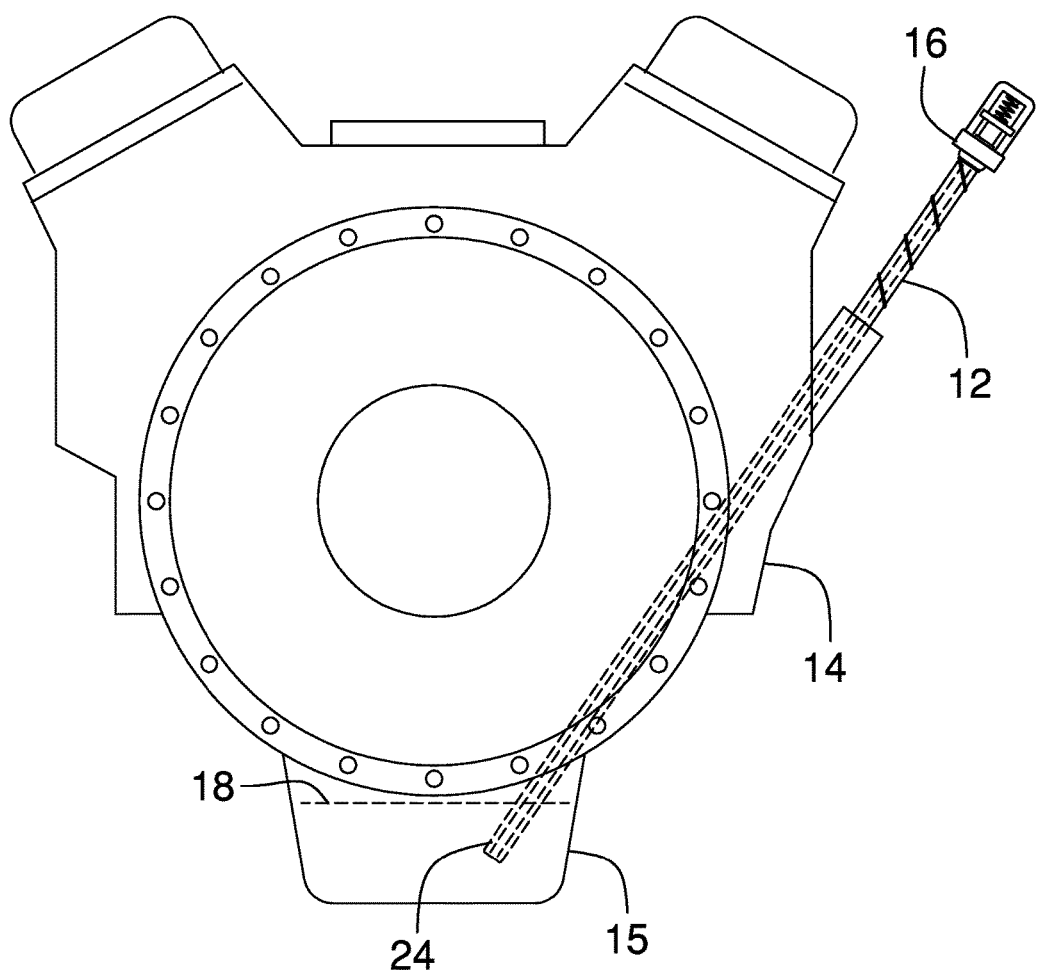
FIG. 7 is a perspective in-use view of an embodiment of the disclosure.

In an alternative embodiment 52 as shown in FIG. 6, an O-ring 54 may be positioned around the plunger 44. The O-ring 54 may frictionally engage the pipe 20 when the plunger 44 is in the closed position. A pin 56 may extend between the handle 40 and the plunger 44. Thus, the pin 56 may guide the plunger 44 upwardly and downwardly.

In use, the pipe 20 is inserted into the tube 12. The second end 24 of the pipe 20 is submerged in the oil in the oil reservoir 15. The disk 48 is urged upwardly and the plunger 44 is positioned in the open position. Thus, the oil flows upwardly into the second end 24 of the pipe 20. The disk 48 is released and the biasing member 50 biases the plunger 44 into the closed position. Thus, the oil is inhibited from draining from the pipe 20. The pipe 20 is removed from the tube 12 and the oil level is viewed through the pipe 20. The pipe 20 is inserted into the tube 12 and the disk 48 is urged upwardly to drain the oil from the pipe 20. The monitoring unit 16 may be retrofitted on the internal combustion engine 14 to replace a traditional oil dipstick.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. An oil level monitoring system comprising:
a tube being configured to be fluidly coupled to an internal combustion engine thereby facilitating said tube to be in fluid communication with an oil reservoir in the internal combustion engine;
a monitoring unit being removably inserted into said tube wherein said monitoring unit is configured to be in fluid communication with the oil reservoir, said monitoring unit being substantially hollow wherein said monitoring unit is configured to have oil from the oil reservoir contained within said monitoring unit when said monitoring unit is inserted into said tube, said monitoring unit being comprised of a translucent material wherein said monitoring unit is configured to facilitate a level of the oil to be observed within the oil reservoir when said monitoring unit is removed from said tube, said monitoring unit including a pipe having a first end and a second end, each of said first end and said second end being open, said pipe being substantially hollow, said pipe being removably inserted into said tube wherein said second end is configured to be submerged in the oil thereby facilitating the oil to enter said pipe, said pipe being comprised of a translucent material;
a stopper being coupled to said first end of said pipe wherein said stopper is configured to be manipulated, said stopper selectively closing said first end wherein said pipe is configured to retain the oil within said pipe when said pipe is removed from said tube, said stopper selectively opening said first end wherein said pipe is configured to facilitate the oil to move vertically within said pipe, said stopper including a flange having said pipe extending therethrough, said flange being positioned adjacent to said first end, said flange closing said tube when said pipe is positioned in said tube, said flange having a top surface;
a plunger slidably extending through said flange such that said plunger extends into said first end, said plunger having an outer surface, said plunger being positioned in a closed position having said outer surface frictionally engaging said first end wherein said plunger is configured to inhibit air from passing through said first end, said plunger being positioned in an open position having said outer surface being spaced from said first end wherein said plunger is configured to facilitate air to pass through said first end;

a handle having a pair of spaced members; and a disk being coupled to said plunger wherein said disk is configured to be manipulated, said disk slidably engaging each of said spaced members of said handle, said disk being urged upwardly from said flange when said plunger is positioned in said open position, said disk being urged downwardly toward said flange when said plunger is positioned on said closed position.

2. The system according to claim 1, further comprising a low ring being positioned within said pipe wherein said low ring is configured to be visible, said low ring being positioned closer to said second end than said first end wherein said low ring is configured to indicate a minimum level of oil.

3. The system according to claim 1, further comprising a high ring being positioned within said pipe wherein said high ring is configured to be visible, said high ring being positioned between said low ring and said first end wherein said high ring is configured to indicate a maximum level of oil.

4. The system according to claim 1, further comprising a handle being coupled to said flange wherein said handle is configured to be gripped, said handle having a pair of spaced members, each of said spaced members extending upwardly from said top surface.

5. The system according to claim 1, further comprising a biasing member extending between said disk and said handle, said biasing member biasing said disk toward said flange such that said plunger is biased into said closed position.

6. An oil level monitoring system comprising:
   a tube being configured to be fluidly coupled to an internal combustion engine thereby facilitating said tube to be in fluid communication with an oil reservoir in the internal combustion engine; and
   a monitoring unit being removably inserted into said tube wherein said monitoring unit is configured to be in fluid communication with the oil reservoir, said monitoring unit being substantially hollow wherein said monitoring unit is configured to have oil from the oil reservoir contained within said monitoring unit when said monitoring unit is inserted into said tube, said monitoring unit being comprised of a translucent material wherein said monitoring unit is configured to facilitate a level of the oil to be observed within the oil reservoir when said monitoring unit is removed from said tube, said monitoring unit comprising:
      a pipe having a first end and a second end, each of said first end and said second end being open, said pipe being substantially hollow, said pipe being removably inserted into said tube wherein said second end is configured to be submerged in the oil thereby facilitating the oil to enter said pipe, said pipe being comprised of a translucent material,
      a low ring being positioned within said pipe wherein said low ring is configured to be visible, said low ring being positioned closer to said second end than said first end wherein said low ring is configured to indicate a minimum level of oil,
      a high ring being positioned within said pipe wherein said high ring is configured to be visible, said high ring being positioned between said low ring and said first end wherein said high ring is configured to indicate a maximum level of oil, and
      a stopper being coupled to said first end of said pipe wherein said stopper is configured to be manipulated, said stopper selectively closing said first end wherein said pipe is configured to retain the oil within said pipe when said pipe is removed from said tube, said stopper selectively opening said first end wherein said pipe is configured to facilitate the oil to move vertically within said pipe, said stopper comprising:
         a flange having said pipe extending therethrough, said flange being positioned adjacent to said first end, said flange closing said tube when said pipe is positioned in said tube, said flange having a top surface,
         a handle being coupled to said flange wherein said handle is configured to be gripped, said handle having a pair of spaced members, each of said spaced members extending upwardly from said top surface,
         a plunger slidably extending through said flange such that said plunger extends into said first end, said plunger having an outer surface, said plunger being positioned in a closed position having said outer surface frictionally engaging said first end wherein said plunger is configured to inhibit air from passing through said first end, said plunger being positioned in an open position having said outer surface being spaced from said first end wherein said plunger is configured to facilitate air to pass through said first end,
         a disk being coupled to said plunger wherein said disk is configured to be manipulated, said disk slidably engaging each of said spaced members of said handle, said disk being urged upwardly from said flange when said plunger is positioned in said open position, said disk being urged downwardly toward said flange when said plunger is positioned on said closed position, and
         a biasing member extending between said disk and said handle, said biasing member biasing said disk toward said flange such that said plunger is biased into said closed position.

* * * * *